April 21, 1936.  H. H. ROBINSON ET AL  2,038,132
STOPCOCK
Filed March 26, 1934    2 Sheets-Sheet 2

Inventors
Henry H. Robinson
and Theodore C. Plath
By
Their Attorney

Patented Apr. 21, 1936

2,038,132

UNITED STATES PATENT OFFICE 2,038,132

STOPCOCK

Henry H. Robinson and Theodore C. Plath, Los Angeles, Calif., assignors to Robinson Orifice Fitting Company, Los Angeles, Calif., a corporation of Nevada Application March 26, 1934, Serial No. 717,404

1 Claim. (Cl. 251—102)

This invention relates to valves, and relates more particularly to the class of valves commonly known as plug valves or stop cocks. A general object of this invention is to provide a simple, practical and particularly effective stop cock.

Another object of the invention is to provide a plug valve or stop cock that is adapted to provide or form positive fluid tight and leak tight seals at both its upstream and downstream ports.

Another object of the invention is to provide a stop cock that may be easily and quickly tested when in the closed position to determine if there is any flow or leakage from either end of the line.

It is another object of the invention to provide a plug valve or stop cock in which the packing glands may be repacked when the cock is closed, without the loss or leakage of fluid.

It is another object of the invention to provide a plug valve that is very easy to operate. In the valve or stop cock of the present invention the sealing members or segments of the plug are forced or operated radially outwardly against the interior of the body to seal therewith after the plug has been moved to its closed position, and are released and fully freed from the wall of the body at the initial opening movement of the plug, so that they do not resist operation or turning of the plug. The plug proper has substantial clearance with the interior of the body and there is very little friction resisting rotation of the plug.

It is another object of the invention to provide a stop cock of the character mentioned in which the actuating pressures or forces on the sealing members are automatically balanced or equalized.

It is another object of the invention to provide a stop cock of the character mentioned in which the sealing members are inexpensive and may be easily and quickly replaced.

It is a further object of the invention to provide a stop cock of the character mentioned that is simple and inexpensive of manufacture and that is adapted to effectively handle fluid at high pressures.

Figure 1:
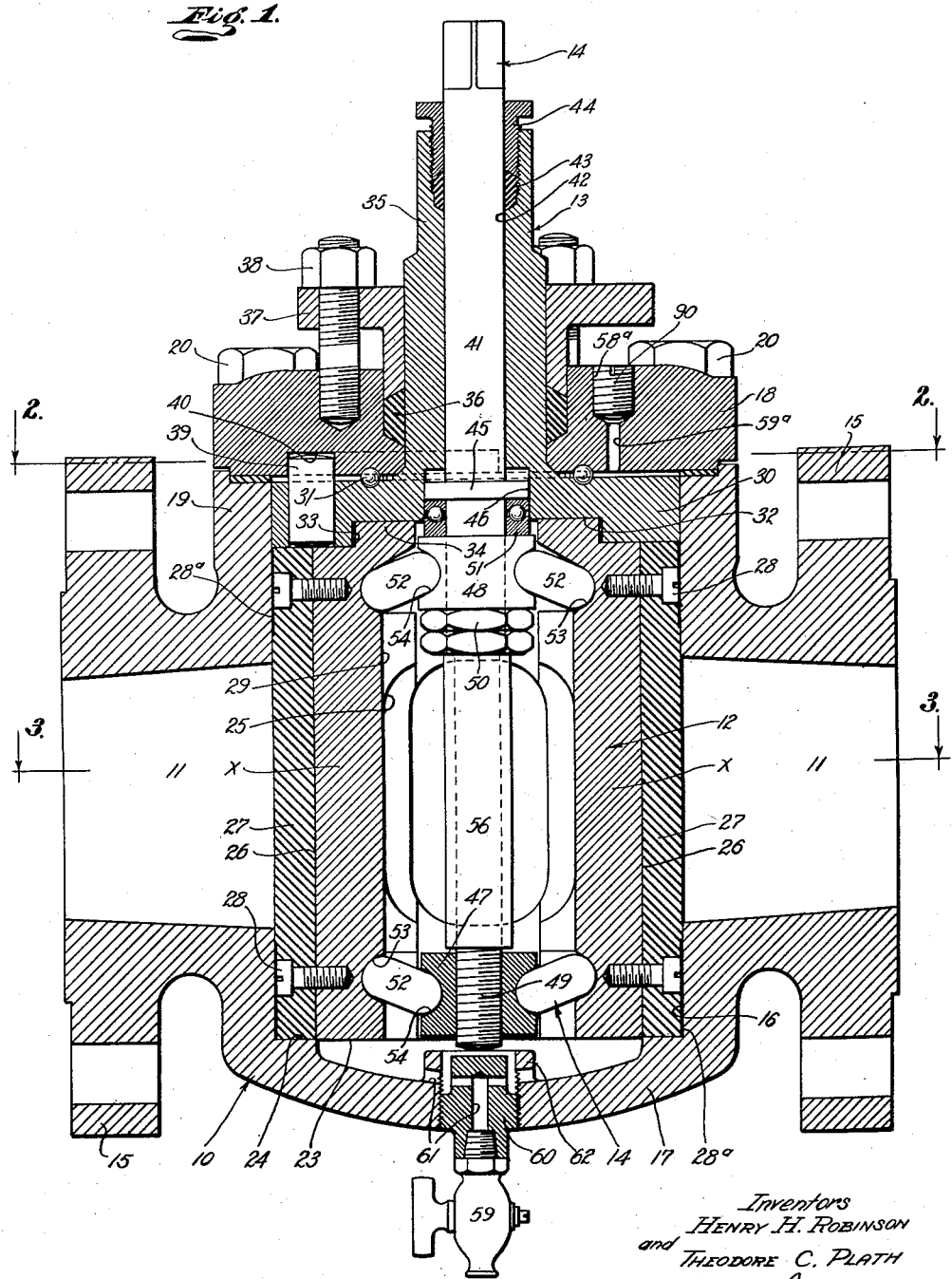
Figure 2:
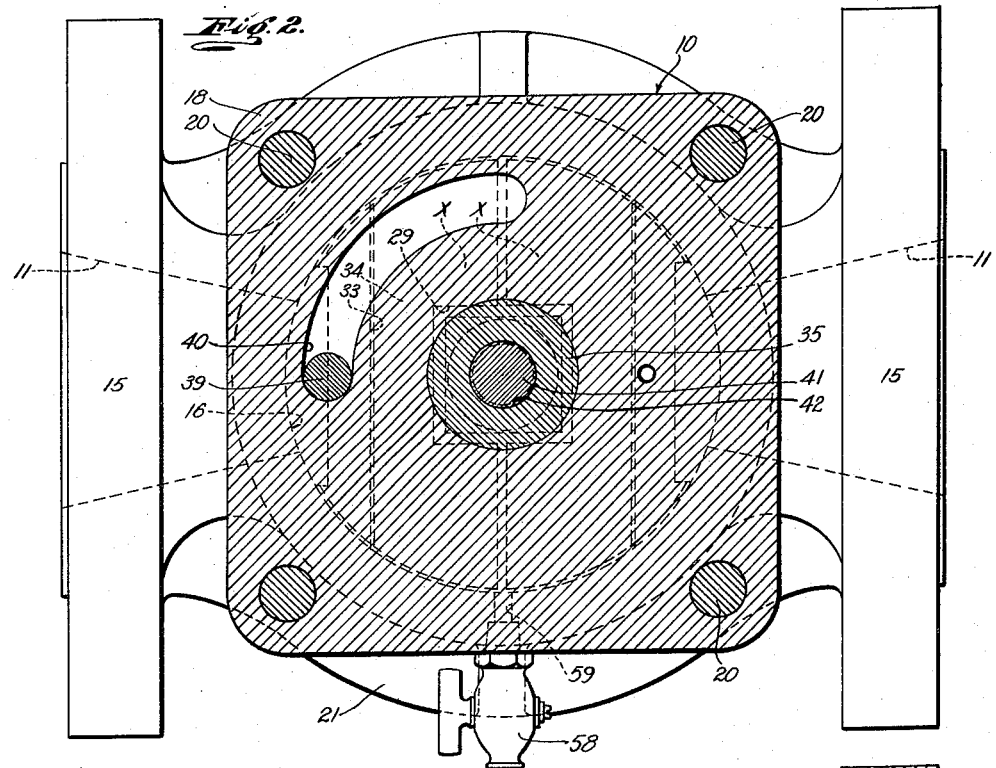
Figure 3:
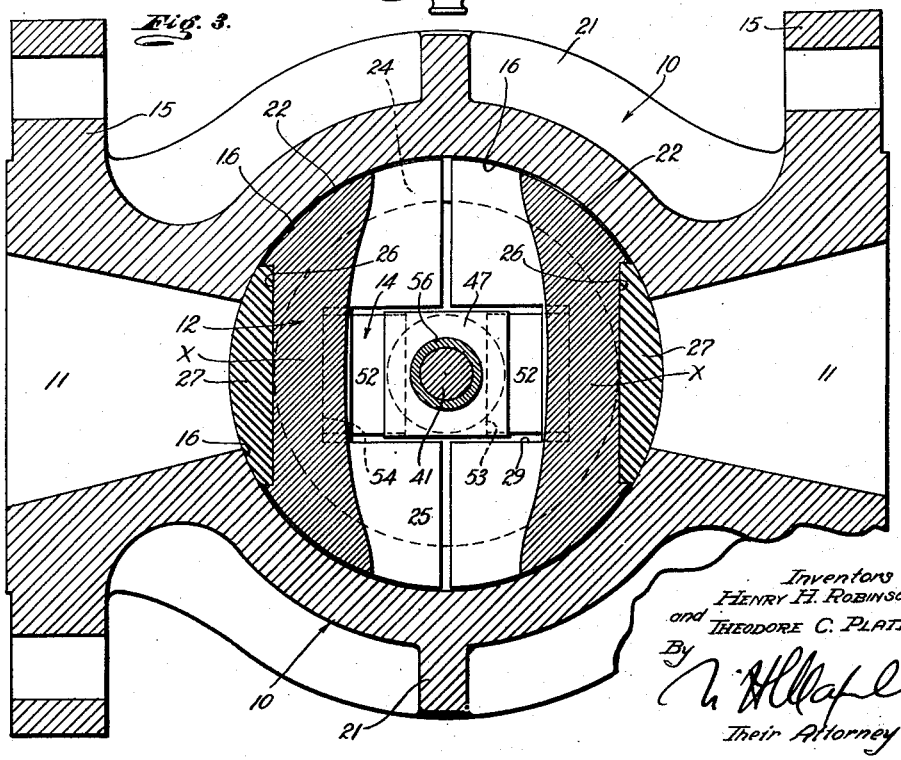

Other objects and features of the invention will be better and more fully understood from the following detailed description of a typical form and application of the invention, throughout which description reference may be had to the accompanying drawings, in which:

Fig. 1 is a longitudinal detailed sectional view of the valve provided by this invention illustrating the plug in the closed position and in sealing contact with the interior of the body. Fig. 2 is a transverse detailed sectional view taken substantially as indicated by line 2—2 on Fig. 1 and Fig. 3 is a transverse, detailed sectional view taken as indicated by line 3—3 on Fig. 1.

The plug valve or stop cock of this invention includes, generally, a body 10 having a fluid passage 11, a plug 12 in the body 10 turnable between the open and closed positions and expansible to seal with the interior of the body when in the closed position, means 13 for turning the plug, and means 14 for expanding the plug 12.

The body 10 is adapted to be connected in a pipe line, being provided with the fluid passage 11 to handle the fluid of the line and being provided with suitable means for connection with parts of the line. In the particular case illustrated in the drawings the means for facilitating connection of the body 10 in the pipe line comprises flanges 15 projecting from the body at the opposite ends of the passage 11. In accordance with the invention the body 10 has an opening 16 intersecting the fluid passage 11. The opening 16 is provided to carry the plug 12 and it is a feature of the invention that the opening 16 may have cylindrical walls and may be of substantially uniform diameter throughout its length. A body wall 17 closes the lower end of the opening 16 while a cap or bonnet 18 is provided to close the upper end of the opening. The body 10 is provided with a head flange 19 and bolts or screws 20 extend through openings in the bonnet 18 and flange 19 to attach the bonnet to the body. The exterior of the body may be provided with joined or intersecting reinforcing flanges 21.

The core or plug 12 is arranged in the body opening 16 and is both turnable and expansible. The plug 12 is cylindrical in its general configuration and its cylindrically curved exterior 22 has substantial clearance with the wall of the body opening 16. The inner end 23 of the plug 12 is flat and seats on an annular shoulder 24 in the body. A transverse opening 25 is provided in the plug 12. The plug 12 is rotatable between a position where its opening 25 is in direct longitudinal register with the fluid passage 11 and a position where the longitudinal axis of the opening 25 is at substantially right angles to that of the fluid passage. In accordance with the invention the plug 12 is longitudinally split or divided into two sections or members X so as to be expansible. The plane of division or separation of the plug 12 includes the longitudinal axis of the opening 25. When the plug 12 is positioned with its opening 25 transverse of the fluid passage 11 the sections or members X directly face or oppose the two ends of the passage 11. The members X of the plug are each provided with a longitudinally extending flat walled recess 26. The recesses 26 extend from one end of the plug to the other and the two recesses are diametrically opposite.

The invention includes seats or inserts 27 carried in the recesses 26. The inserts 27 are removably attached to the plug members X to be readily replaceable. In the case illustrated countersunk screws 28 attach the inserts 27 to the plug members X in manners so that the inserts may be easily detached from the plug. The seats or inserts 27 have flat inner sides bearing against the flat inner walls of the recesses 26 and have flat longitudinal edges seating against the longitudinal walls of the recesses. The material of which the seats or inserts 27 is formed depends upon the character or class of fluid which is to be handled by the valve. It may be practical to form the inserts 27 of bakelite, copper, bronze, stainless steel or the like. The seats or inserts 27 are provided to engage or seal against the wall of the opening 16 at the fluid passage 11 to close off both the upstream and the downstream portions of the passage.

The inserts 27 project beyond the exterior or periphery of the plug members X and their outer sides are cylindrically curved and have the same radius of curvature as the wall of the opening 16. The sealing inserts 27 are finished to evenly and tightly seal with the wall of the body opening 16. In the preferred construction the inserts 27 are proportioned to entirely cover the ends of the fluid passage 11 and engage the wall of the opening 16 for some distance around the ends of the passage. The opposite end portions 28ᵃ of the inserts 27 may be relieved or reduced in diameter to have clearance with the wall of the opening 16 so that the sealing pressure exerted by the plug expanding means 14 is concentrated on limited areas of the wall of the opening 16. The plug 12 is provided with a central longitudinal opening 29 which extends through it from one end to the other.

The means 13 for turning the plug 12 is intended to be operated to rotate the plug between the open and closed positions when the plug is contracted or free to contract with the means 14 unactuated. The plug operating or turning means 13 includes a plate 30 arranged in the body opening 16 between the bonnet 18 and the upper end of the plug. The plate 30 is rotatable and an antifriction bearing 31 is provided between the plate and the underside of the bonnet 18. A socket or recess 32 is provided in the inner side of the plate 30 and has straight tangential side walls providing the plate with parallel opposing shoulders 33. Ribs or keys 34 are provided on the upper ends of the plug members X to extend into the recess 32. The outer sides of the keys 34 are flat and tangential and are adapted to be engaged by the shoulders 33. In the preferred form of the invention the shoulders 33 and the sides of the keys 34 have substantial clearance, when the plug 12 is expanded, for the purpose to be hereinafter described.

A tubular boss or stem 35 is provided on the plate 30 and projects outwardly through a central opening in the bonnet 18. The projecting portion of the stem 35 is polygonal for engagement by a wrench or other suitable turning tool. Packing 36 is carried in the bonnet 18 and is maintained under compression by a follower or gland 37. Nuts 38 are threaded on studs projecting from the bonnet 18 to actuate the gland 27 inwardly. The packing 36 effectively seals about the stem 35. Means is provided for limiting rotation of the plate 30 and plug 12. A pin or stop 39 projects upwardly from the plate 30 and extends into a curved or arcuate opening 40 in the bonnet 18. The opening 40 may be of approximately 90° extent to have its ends engaged by the stop 39 to stop or position the plug 12 in its open and closed positions. It is believed that it will be apparent how the plug 12 may be turned to the desired position by engaging the stem 35 with a suitable turning tool and turning the stem to cause corresponding turning of the plug.

The means 14 for expanding the plug 12 is an important feature of the invention and is operatable to move or actuate the two plug members X outwardly to bring the inserts 27 into sealing contact with the wall of the opening 16 around the fluid passage 11. The means 14 for actuating the plug members X outwardly includes a mandrel or stem 41 extending longitudinally through the plug opening 29 and an opening 42 in the stem 35. The mandrel or stem 41 is rotatable and longitudinally shiftable. The end portion of the stem 41 which extends beyond the stem 35 is polygonal for engagement by a wrench or the like. Packing 43 is arranged in the opening 42 to seal about the stem 41 and a threaded follower or gland 44 is provided to retain the packing in sealing contact with the stem. The inner or lower end of the stem 41 may project beyond the plug 12 and may normally have considerable clearance with the wall 17 of the body whereby the stem 41 may be shifted longitudinally. An annular flange 45 is provided on the stem 41 and is rotatable and longitudinally shiftable in a socket 46 in the inner side of the plate 30.

The plug expanding means 14 includes a nut 47 threaded on the inner end portion of the stem 41 and a block or nut 48 on the stem 41 in the upper portion of the plug. The nut 48 is free to turn with respect to the stem 41. The cooperation of the thread 49 of the stem with the nut 47 is adapted to move the stem longitudinally or the nut 47 longitudinally depending upon the relationship between the resistance to these two movements. A boss or stop 62 may be provided on the body wall 17 to limit downward movement of the nut 47. The nut 48 is movable longitudinally with the stem 41. The lower end of the nut 48 rests against a nut 50 stationarily threaded on the stem 41 and the upper end of the nut 48 engages an anti-friction bearing 51. The bearing 51 is arranged between the nut 48 and the flange 45 of the stem. The means 14 is in the nature of a toggle means and includes toggle blocks or toggles 52 arranged between the nuts 47 and 48 and the inner sides of the plug members 12. The toggles 52 are elongate members having rounded inner and outer sides or ends. Rounded or concaved recesses 53 are provided in the wall of the opening 29 or the inner sides of the plug members X to receive the rounded outer ends of the toggles 52. The inner ends of the toggles 52 are received in elongate recesses 54 in the nuts 47 and 48. The recesses are provided in diametrically opposite sides of the nuts and the engagement of the toggles in the recesses prevents turning of the nuts with respect to the plug 12.

The nuts 47 and 48 are positioned so that the toggles 52 are pitched or inclined. The toggles 52 are inclined outwardly from the nuts and toward or in the general direction of the fluid passage 11. Means may be provided for limiting the upward movement of the nut 47 on the stem 41 thus limiting tilting of the toggles 52 toward the normal or horizontal positions and preventing excessive outward movement of the plug members X. A sleeve 56 surrounds the stem 41 between the stationary nuts 50 and the nut 47 and its lower end is adapted to be engaged by the nut 47 to limit movement of the nut upwardly on the stem.

To expand the plug 12 or actuate the plug members X outwardly the stem 41 is turned in a right hand direction so that the cooperation of the thread 49 with the thread of the nut 47 moves the nut inwardly on the stem or causes movement of the stem in the opposite direction, or both. These movements of the nut 47 and the stem 41 cause pivoting of the toggles 52 toward the horizontal positions which forces the members X outwardly so that the inserts 27 come into sealing contact with the wall of the body opening 16. In practice the resistance to outward swinging or tilting of the toggles 52 of the nut 47 and the consequent resistance to movement of the nut 47 along the stem is followed by or accompanied with longitudinal movement of the stem 41 in a direction to cause active pivoting or tilting of the toggles 52 at the nut 48. In a like manner when longitudinal movement of the stem in this direction is resisted through the action of the toggles 52 at the nut 48 the nut 47 is caused to move longitudinally of the stem 41 providing, of course, that the stem 41 is being rotated. The expansive movement or outward movement of the opposite ends of the plug members X are thus equalized or balanced and the members X act outwardly with even or equal pressures, insuring tight effective seals with the wall of the body opening 16. To relieve the plug members X of the outward force and to permit contraction of the plug 12 the stem 41 is turned in a left hand direction to cause movement of the nut 47 outwardly or downwardly on the stem 41 and movement of the stem 41 upwardly thus releasing the upper and lower sets of toggle blocks 52.

The invention includes means for testing the valve or stop cock to determine if there is any leakage from either end of the pipe line. A testing valve or bleeder valve 58 communicates with a port 59 in the wall of the body 10. The port 59 has communication with the body opening 16 at the plate 30. After the plug 12 has been moved to its closed position and has been expanded so that the inserts 27 are tightly fitted against the wall of the opening 16, the bleeder valve 58 may be opened to relieve pressure from the opening 16. If discharge from the bleeder valve 58 continues it indicates that there is leakage past one or both of the inserts 27. One or more ports 59ª may be provided in the bonnet 18 to communicate with the upper portion of the opening 16 to receive the test or bleeder valve 58 whereby the stop cock may be set at various positions and yet have the valve 58 communicate with the uppermost part of the opening 16. The unused openings 58ª may be normally closed by plugs 90. A drain valve 59ᵇ is threaded into a plug 60 in the lower wall 17 of the body. Ports 61 in the plug 60 and stop 62 put the valve 59ᵇ in communication with the lower end of the opening 16.

To close the plug valve or stop cock of the invention the stem 35 is engaged by a turning tool or wrench and is turned in a right hand direction until the stop 39 engages an end of the opening 40 to position the plug 12 where its inserts 27 directly oppose the opposite ends of the fluid passage 11. The stem 41 is then turned in a right hand direction to expand the plug 12. As described above, rotation of the stem 41 in a right hand direction results in inward or upward movement of the nut 47 on the stem 41 and downward movement of the stem 41 and nut 48. These movements tilt or pivot the toggles 52 toward the horizontal positions so that the toggles actuate the plug members X outwardly. As above described, the plug expanding movements of the nut 47 and the stem 41 and nut 48 are automatically balanced or equalized to provide for the proper equal outward operation of the opposite ends of the plug members X. The stem 41 may be turned sufficiently to bring the inserts 27 of the plug into tight effective sealing cooperation with the wall of the body opening 16.

When it is believed that the valve has been fully and properly closed the bleeder valve 58 may be opened. Opening of the bleeder valve 58 immediately relieves pressure in the interior of the body 10 and if there is little or no discharge from the bleeder valve it indicates that the fluid passage 11 has been tightly closed off. It is to be noted that the inserts 27 of the two plug members X effectively seal both the upstream and downstream ends of the passage 11. As the periphery 22 of the plug 12 has clearance with the wall of the opening 16 there is little resistance to turning of the plug to the closed position. The inserts 27 are not subjected to any frictional engagement with the interior of the body during closing of the valve and are actuated against the wall of the opening 16 after the plug 12 has been moved to its closed position.

To open the valve or stop cock the stem 41 is turned in a left hand direction to cause downward movement of the nut 47 and upward movement of the stem and the nut 48. These movements of the nuts 47 and 48 relieve the outward or expansive pressures on the plug members X so that the members are free to contract. The stem 35 is then turned to move the plug 12 to its open position where the opening 25 is in register with the fluid passage 11. With the initial turning movement of the stem 35 the advancing parts of the shoulders 33 engage the keys 34 to transmit the turning movement to the plug 12. As described above there is substantial clearance between the shoulders 33 and the keys 34 and turning of the stem 35 to move the plug to its open position causes the shoulders 33 to strike against the keys 34 in a manner to lift or pick the inserts 27 free from the walls of the opening 16 in the event that the inserts have a tendency to stick or remain in contact with the wall of the opening. As the toggle means has been previously released the plug members X are free to contract permitting the inserts 27 to free themselves from the wall of the opening 16. Because of the above mode of operation the valve is particularly easy to operate. When the valve or stop cock is closed with the inserts 27 in tight sealing engagement with the wall of the opening 16 the bleeder valve 28 may be opened to relieve the interior of the body of pressure and the packing 36 and 43 may be replaced without any danger or possibility of leakage. The valve or stop cock of the present invention is simple and dependable in operation and is capable of effectively handling fluids of high pressures.

Having described only a typical form and application of our invention we do not wish to be limited or restricted to the specific form and application herein set forth, but wish to reserve to ourselves any modifications or variations that may appear to those skilled in the art or fall within the scope of the following claim.

Having described our invention, we claim:

A valve including a body having a fluid passage and an opening intersecting the passage, a plug turnable in the opening between a position where it allows the flow of fluid through the passage and a closed position, the plug being longitudinally split into two members, means for operating the members outwardly to seal the opening from both ends of the passage, a drain valve communicating with the lower portion of the opening and a bleeder valve having communication with the upper portion of the opening for the testing of the sealing of the members.

HENRY H. ROBINSON.
THEODORE C. PLATH.